United States Patent
Cazals et al.

(10) Patent No.: US 10,329,010 B2
(45) Date of Patent: Jun. 25, 2019

(54) AIRCRAFT WING COMPRISING A CONTROLLABLE-ATTACK WING TIP

(71) Applicant: Airbus Operations (SAS), Toulouse (FR)

(72) Inventors: Olivier Cazals, Blagnac (FR); Thierry Druot, Saint-Jean (FR)

(73) Assignee: Airbus Operations SAS, Toulouse (FR)

( * ) Notice: Subject to any disclaimer, the term of this patent is extended or adjusted under 35 U.S.C. 154(b) by 398 days.

(21) Appl. No.: 15/182,709

(22) Filed: Jun. 15, 2016

(65) Prior Publication Data

US 2016/0368594 A1    Dec. 22, 2016

(30) Foreign Application Priority Data

Jun. 16, 2015   (FR) .................................... 15 55494

(51) Int. Cl.
  *B64C 3/42*    (2006.01)
  *B64C 3/38*    (2006.01)
  *B64C 5/10*    (2006.01)
  *B64C 23/06*   (2006.01)

(52) U.S. Cl.
  CPC .............. *B64C 23/072* (2017.05); *B64C 3/38* (2013.01); *B64C 3/385* (2013.01); *B64C 3/42* (2013.01); *B64C 5/10* (2013.01); *Y02T 50/164* (2013.01)

(58) Field of Classification Search
  CPC ....... B64C 23/072; B64C 23/069; B64C 3/58; B64C 3/56; B64C 3/42; B64C 3/385; B64C 3/38; B64C 5/10; B64C 5/08
  See application file for complete search history.

(56) References Cited

U.S. PATENT DOCUMENTS

| | | | | |
|---|---|---|---|---|
| 2,186,558 A | * | 1/1940 | Rouanet | B64C 1/26 244/38 |
| 4,247,062 A | * | 1/1981 | Brueckner | B64C 5/08 244/36 |
| 4,542,866 A | * | 9/1985 | Caldwell | B64C 5/12 244/45 A |
| 5,156,358 A | * | 10/1992 | Gerhardt | B64C 5/08 244/36 |
| 6,547,181 B1 | | 4/2003 | Hoisington et al. | |
| 8,757,555 B2 | * | 6/2014 | Werthmann | B64C 23/072 244/199.4 |
| 2004/0262451 A1 | | 12/2004 | McLean | |
| 2005/0133672 A1 | | 6/2005 | Irving et al. | |
| 2008/0191099 A1 | | 8/2008 | Werthmann et al. | |

FOREIGN PATENT DOCUMENTS

| | | |
|---|---|---|
| DE | 10313290 | 10/2004 |
| EP | 1493660 | 1/2005 |

OTHER PUBLICATIONS

French Search Report, dated Feb. 22, 2016 priority document.

\* cited by examiner

*Primary Examiner* — Richard R. Green

(74) *Attorney, Agent, or Firm* — Greer, Burns & Crain, Ltd.

(57) ABSTRACT

An aircraft wing, including a main part and a wing tip mounted mobile in attack relative to the main part.

15 Claims, 6 Drawing Sheets

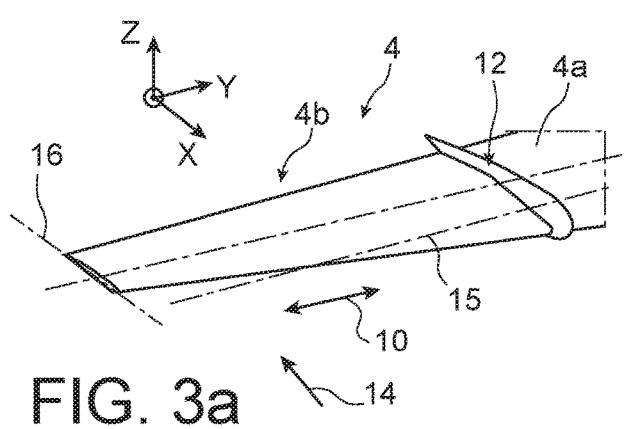
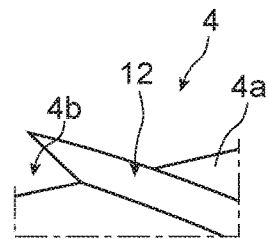
FIG. 3a
FIG. 3b
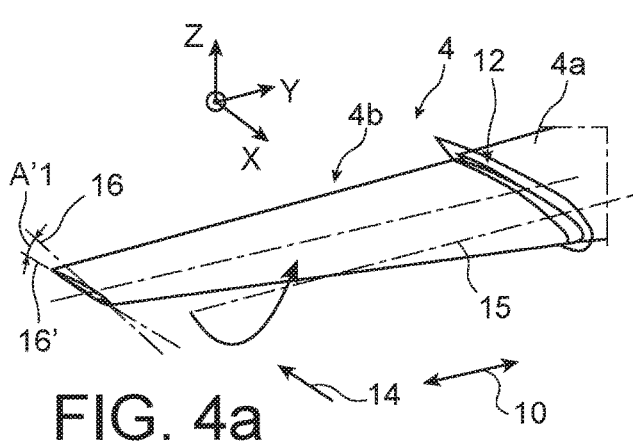
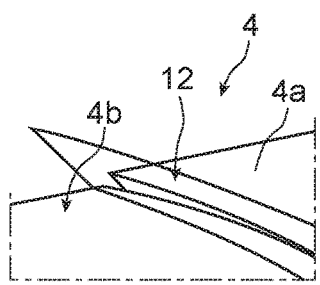
FIG. 4a
FIG. 4b
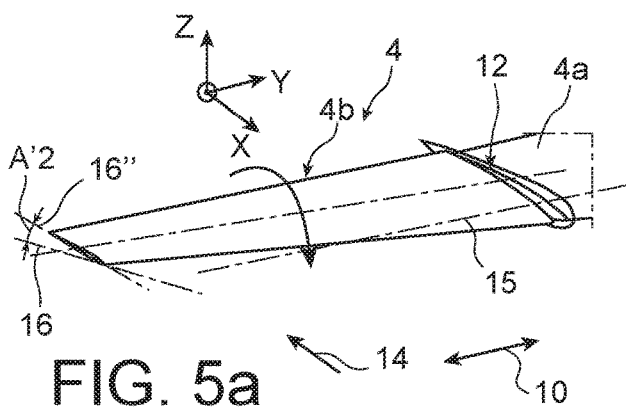
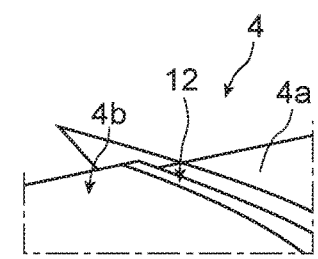
FIG. 5a
FIG. 5b

AIRCRAFT WING COMPRISING A CONTROLLABLE-ATTACK WING TIP

CROSS-REFERENCES TO RELATED APPLICATIONS

This application claims the benefit of the French patent application No. 1555494 filed on Jun. 16, 2015, the entire disclosures of which are incorporated herein by way of reference.

BACKGROUND OF THE INVENTION

The present invention relates to the field of aircraft wings.

Aircraft wings have already been the subject of numerous developments that aim to improve their overall performance. This refers, for example, to the installation of flaps or analogous elements with the aim of addressing specific requirements as a function of the various flight phases of the aircraft.

However, most of the solutions introduced by the prior art remain open to improvement, notably in that they are liable to generate unwanted drag during certain flight phases and in that they make the design of the wings that integrate this type of solution more complicated. There is, therefore, a requirement to optimize the design of existing wings and to address this requirement at least partially.

SUMMARY OF THE INVENTION

The invention therefore provides a degree of freedom in attack between the wing tip, also known as the "wing end," and the main part of the wing. The provision of this degree of freedom makes it possible to improve the overall performance of the wing, for the following reasons. First of all, during the cruising phase of the aircraft, controlling the wing tip in attack makes it possible to adapt the induced drag optimally as a function of the flight altitude and/or the mass of the aircraft. In other words, thanks to this control in attack, the wing has a variable lift distribution that renders it suited to numerous mass and flight altitude conditions, compared to a conventional wing adapted to only one optimum altitude for each total mass of the aircraft.

Moreover, in approach and landing phases, if the wing tip can be oriented so that the local attack at the wing tip is low or even zero (this is referred to as untwisting the wings), this configuration generates an increase in the mechanical loading of the main part of the wing. This reduces the wake produced by the wing, the wake then being less concentrated at the wing tip. Because of the attenuation of this wake, aircraft can advantageously land one after the other at a higher frequency.

Still in the approach phase and with the wing tip providing untwisting of the wings, it becomes possible to generate a high drag making it possible to improve the capability of the aircraft to descend with a steep slope.

This particular position of the wing tip is equally beneficial during landing, because it not only makes it possible to generate drag but also generates an improved braking capability of the aircraft by increasing the load transmitted to the main landing gear.

Moreover, the junction device is configured to allow rotation of the wing tip relative to the main part about a first rotation axis enabling control in attack of the wing tip and to allow rotation of the wing tip relative to the main part about a second rotation axis enabling the wing tip to be folded to raise it.

The first rotation axis is preferably substantially parallel to a spanwise direction of the wing or oriented substantially along a transverse direction Y of the aircraft and the second rotation axis is preferably substantially parallel to a direction of flow of the airflow over the wing.

The main part of the wing preferably extends over a distance D1 in the spanwise direction and the wing tip preferably extends over a distance D2, the ratio between the distances D1 and D2 being fixed as a function of the requirements and constraints encountered.

The wing tip can be mounted mobile in attack relative to the main part in accordance with a limited amplitude, preferably within a range of angles between 15 and −15°, in particular when only the first rotation axis is provided between the wing tip and the main part of the latter. On the other hand this range of angles can be extended from −15 and −90°, in particular, if the second rotation axis is also provided.

The invention also comprises an aircraft including at least one wing as described above as well as a device for controlling the wing tip in attack relative to the main part of the wing.

Finally, the invention also comprises a method of controlling the aircraft when described above including control in attack of the wing tip relative to the main part of the wing as a function of at least one flight parameter.

Other advantages and features of the invention will become more apparent in the following nonlimiting detailed description.

BRIEF DESCRIPTION OF THE DRAWINGS

This description will be given with reference to the appended drawings, in which:

FIGS. 3a, 4a and 5a show a part of one of the two wings of the aircraft with the wing tip adopting different attacks;

FIGS. 3b, 4b, 5b are views showing more specifically, to a larger scale, the junction between the wing tip and the main part of the wing in the three positions represented in FIGS. 3a, 4a and 5a, respectively;

DETAILED DESCRIPTION OF THE PREFERRED EMBODIMENTS

Figure 1:
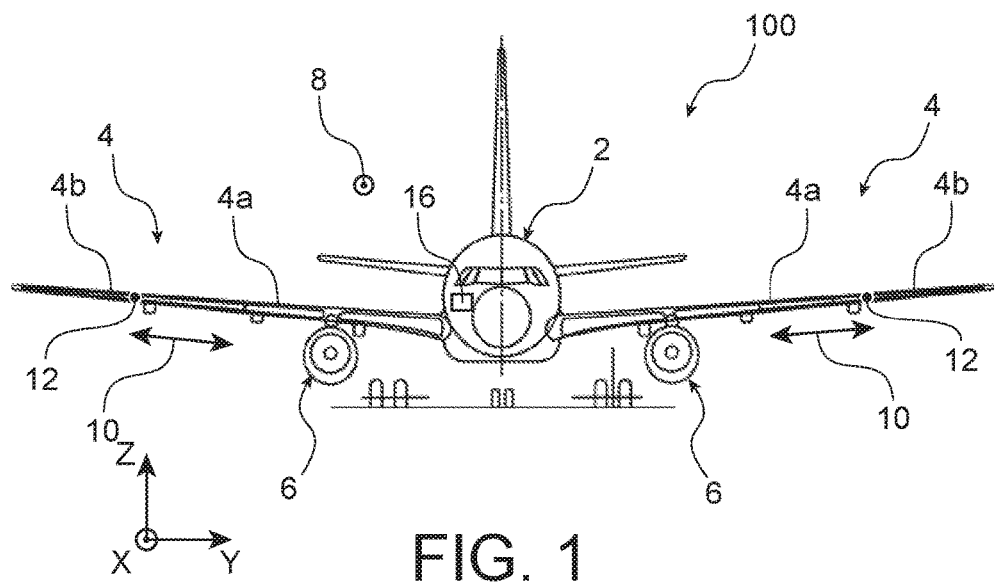
FIG. 1 represents a diagrammatic head-on view of an aircraft including wings in accordance with the invention.
Figure 2:
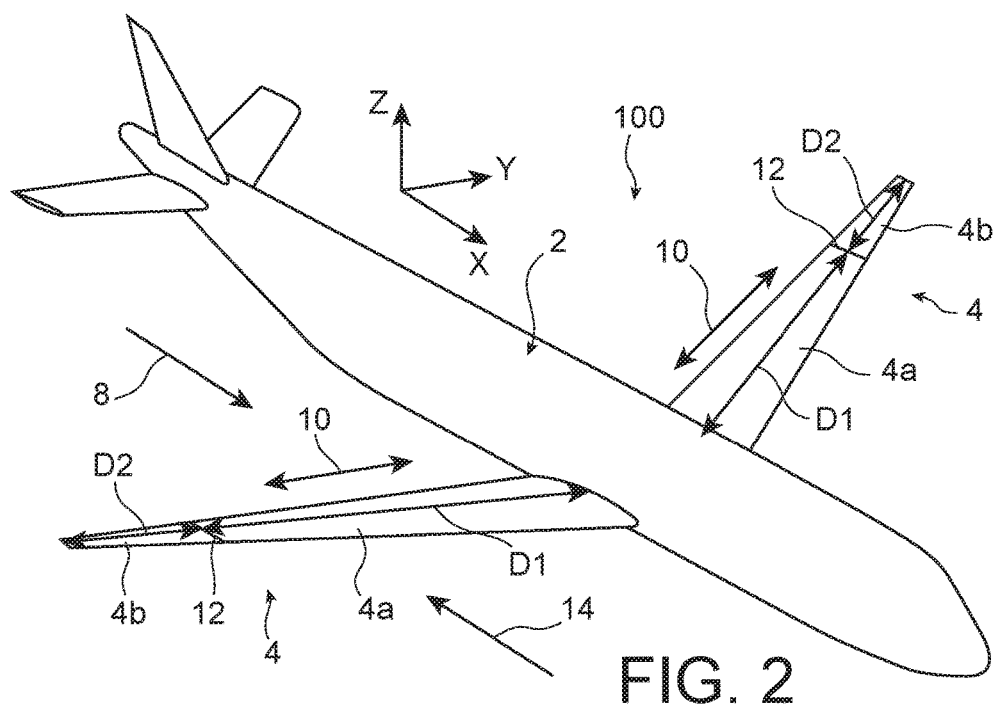
FIG. 2 represents a simplified perspective view of the aircraft shown in the previous figure.

Referring first of all to FIGS. 1 and 2, there is represented an aircraft 1 in accordance with the invention including a fuselage 2, two wings 4, and a propulsion unit 6 fixed under each wing 4. One of the particular features of the invention resides in the optimized design of each of the two wings 4, which will be described in detail hereinafter.

Throughout the following description, by convention, the direction X corresponds to the longitudinal direction of the aircraft, the direction Y corresponds to the direction oriented transversely, while the direction Z corresponds to the vertical direction or height. These three directions X, Y and Z are mutually orthogonal and form a direct trihedron. Also, the terms "front" and "rear" are to be considered relative to a direction of forward movement of the aircraft, diagrammatically represented by the arrow 8.

The two wings 4 being of symmetrical design with respect to a vertical median plane of the aircraft, only one of these two wings will be described in detail hereinafter. The wing 4 extends in a spanwise direction 10 from the fuselage 2. To be more precise, the wing includes first of all a wing main part 4a that is fixed to the fuselage and that extends a distance D1 in the spanwise direction 10. The wing main part 4a is connected by a junction device 12 to a wing tip 4b that extends this part 4a in the spanwise direction by a distance D2. The tip 4b then constitutes the distal end of the wing. Each of the two portions 4a, 4b extends the full width of the wing 4 in the direction X, parallel to a direction 14 of flow of the airflow over this wing during flight.

The junction device 12, one embodiment of which will be described with reference to FIGS. 9a to 9e, enables control in attack of the wing tip 4b relative to the main part 4a. To this end, a control device 18 on board the aircraft enables control in attack of the tip 4b during flight, as a function of various flight parameters such as the altitude of the aircraft or its overall mass.

Referring to FIGS. 3a and 3b, the wing tip 4b is represented in a position of zero attack relative to the main part 4a. In other words, in this position, the wing tip 4b is in perfect continuity with the main part 4a in the spanwise direction 10.

In the cruising phase, control in attack of the wing tip 4b makes it possible to adapt the induced drag optimally, notably as a function of the flight altitude. It is therefore possible to cause this wing tip 4b to pivot about a first rotation axis 15 which here is substantially oriented in the direction Y. It is nevertheless noted that the axis 15 may be oriented differently, for example parallel to or substantially inclined relative to the spanwise direction 10. More generally, the rotation axis 15 is orthogonal to a junction plane between the two parts 4a, 4b of the wing. For reasons of simplification and of clarity of the description, it will be considered hereinafter that the rotation axis 15 is oriented substantially in the direction Y.

In FIGS. 4a and 4b there has been represented a position of positive attack in which the wing tip 4b is pivoted by an angle A'1 about the axis 15 so that its leading edge is oriented upwards and its trailing edge downwards. Conversely, in FIGS. 5a and 5b there has been represented a position of negative attack in which the wing tip 4b is pivoted by an angle A'2 about the axis 15 so that its leading edge is oriented downwards and its trailing edge upwards. The angle A'1 is defined between the chord 16 of the tip when it occupies its imaginary position of zero attack and the chord 16' of this tip in its real position of positive attack. In the same way, the angle A'2 is defined between the chord 16 of the tip when it occupies its imaginary position of zero attack and the chord 16" of this tip in its real position of negative attack.

The amplitude by which the wing tip 4b can be controlled in attack is limited. For example, the angle A'1 is limited to 15°, while the angle A'2 may be limited to approximately −90°, so as to bring the wing tip 4b substantially vertical. This procures numerous advantages, notably in approach and landing phases, because this position generates an increase in the mechanical loading of the main part 4a of the wing by eliminating the forces applied to the tip 4b. The advantageous result of this is a reduction of the wake generated by the wing, the wake then being less concentrated at the wing tip. Because of the attenuation of this wake, aircraft can therefore land one after the other with a higher frequency.

Similarly, it becomes possible to generate a high drag making it possible to increase the capability of the aircraft to descend with a steep slope. This particular position of the wing tip is also beneficial during landing, because it not only makes it possible to generate drag but it also generates a better braking capability of the aircraft by increasing the load transmitted to the main landing gear.

Figure 6:
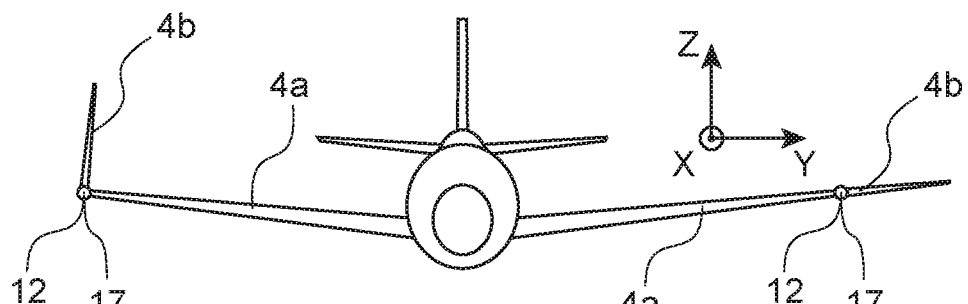
FIG. 6 represents a head-on view of the aircraft with its right wing having a wing tip shown in a position raised to the vertical.
Figure 7A:
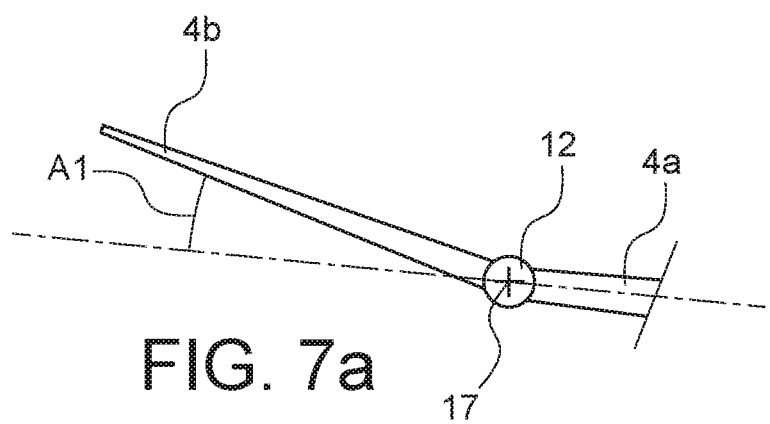
FIG. 7a shows a part of the wing shown in the previous figures with its wing tip raised by an angle A1.
Figure 7B:
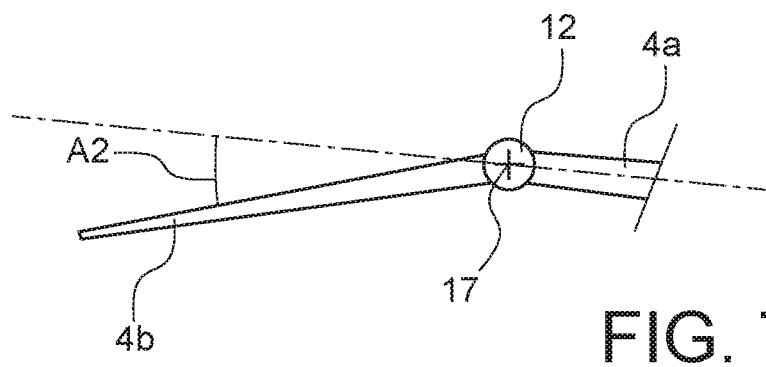
FIG. 7b shows a part of the wing shown in the previous figures with its wing tip lowered by an angle A2.
Figure 8:
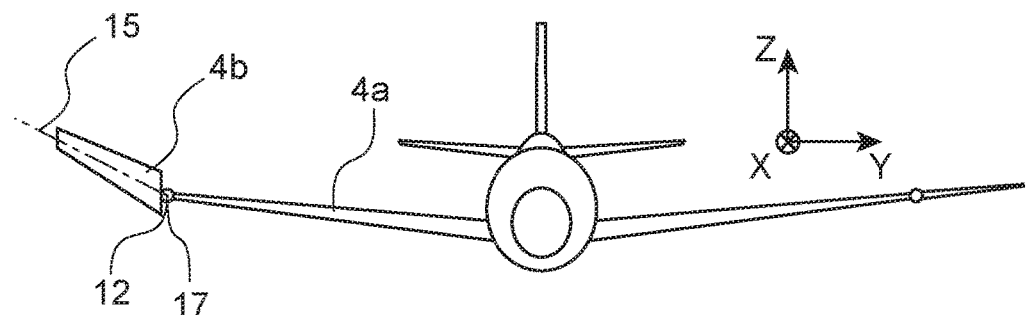
FIG. 8 represents a head-on half-view of the aircraft with its right wing having a tip raised relative to the main part and also having an attack relative to the latter.
Figure 9A:
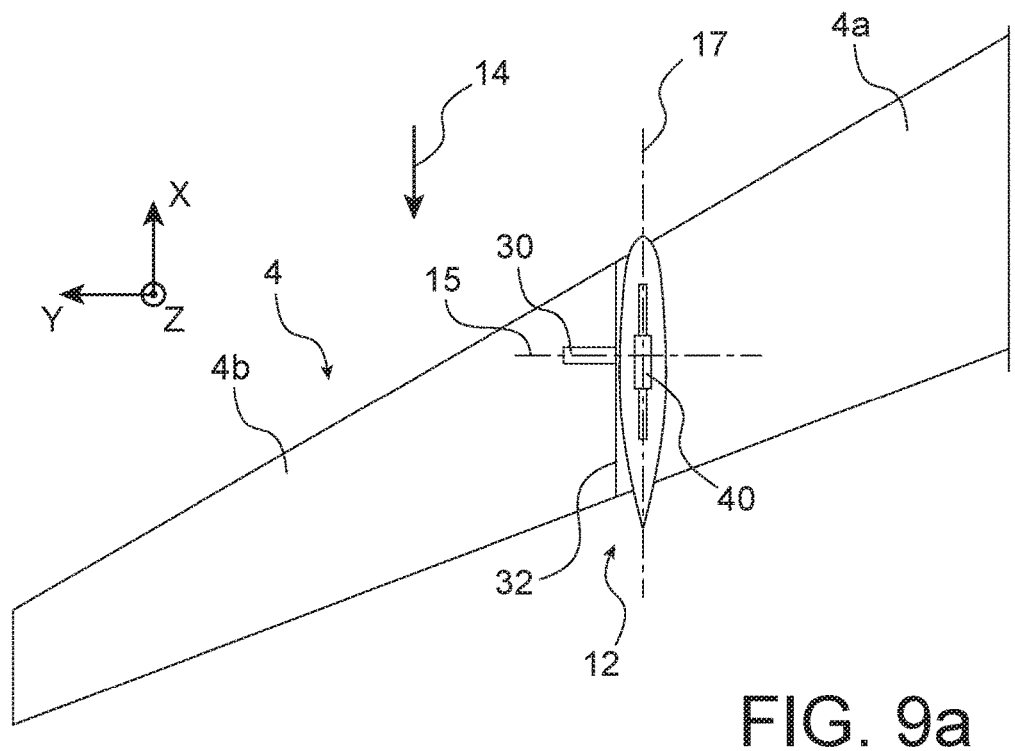
FIGS. 9a to 9e represent one embodiment of a junction device between the wing tip and its main part.
Figure 9B:
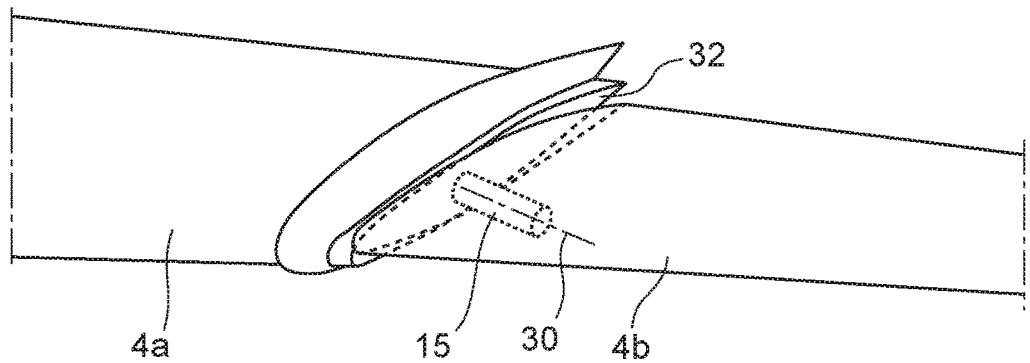
Figure 9C:
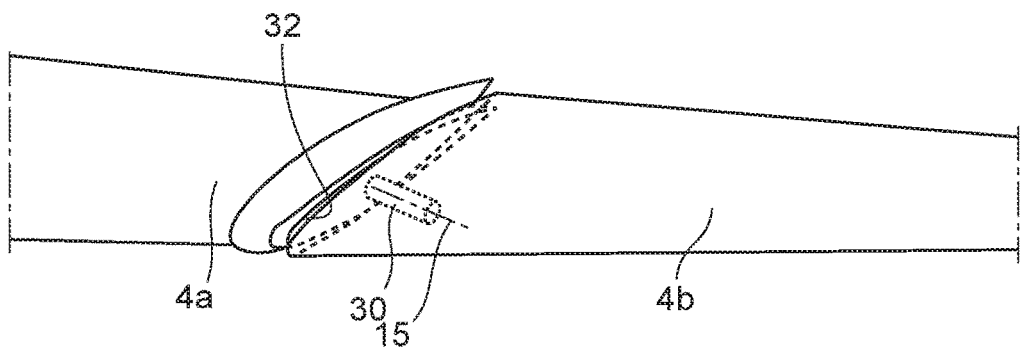
Figure 9D:
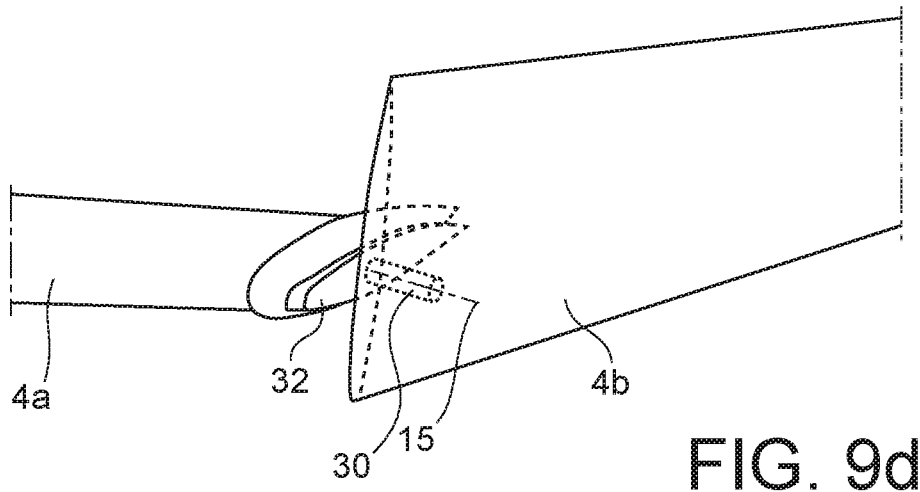
Figure 9E:
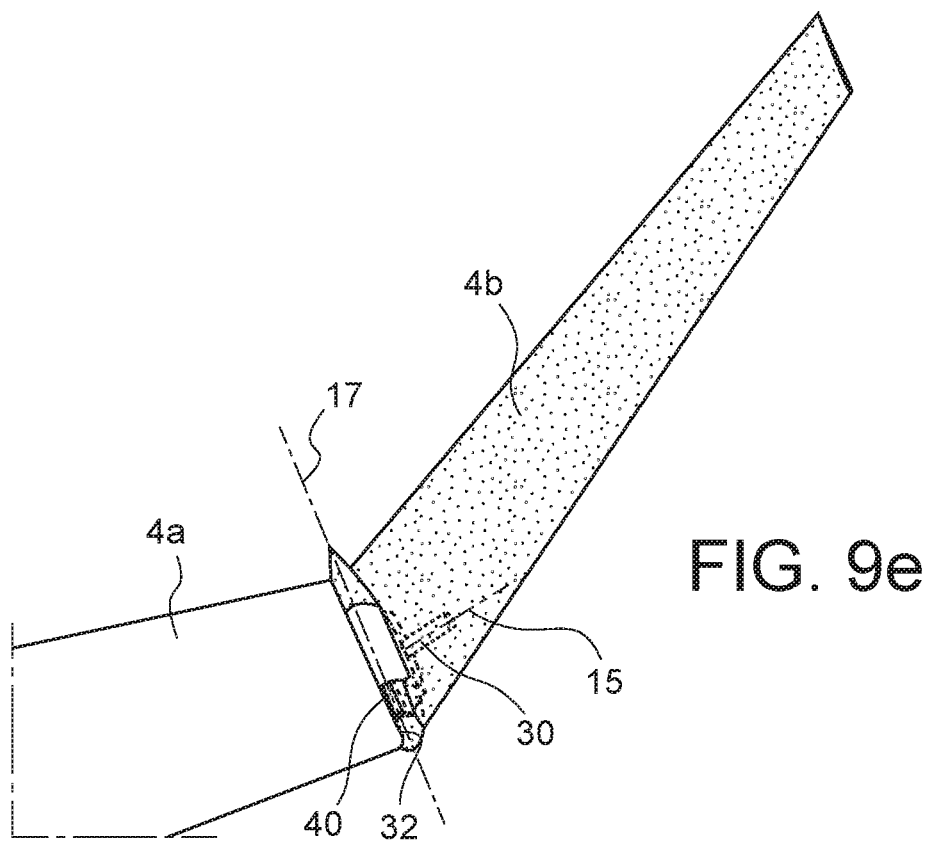

Referring now to FIGS. 6 to 8, it is shown that the junction device 12 is also designed to provide a second degree of freedom in rotation between the wing tip 4b and the main part 4a. This second degree of freedom is operative about a second rotation axis 17 substantially parallel to the direction 14 of flow of the airflow over the wing. It makes it possible to raise the wing tip 4b, notably during the taxiing phase, to reduce its span and to improve its compatibility with different airports. In the FIG. 6 example, the wing tip 4b is raised until it adopts a substantially vertical position in which its span is minimized.

However, it is noted that this second degree of freedom in folding confers numerous other advantages. First of all, this makes it possible to have a long wing, which is beneficial for performance in flight while conserving a satisfactory footprint in the taxiing phase, thanks to the possibility of raising the tip and therefore preventing the latter touching the ground because of static deformation of the wing. This position partially raised by an angle A1 is shown in FIG. 7a.

As shown in FIG. 7b, it is also possible to lower the wing tip 4b by an angle A2 during the cruising phase to improve the performance of the aircraft.

Moreover, it is noted that the control in rotation of the tip 4b about the axis 17 makes it possible to distribute accurately the loads between the main part 4a and the wing tip 4b. This control is also effected by means of the aforementioned control device 18, it being understood that the tip 4b can be controlled simultaneously in attack and in folding, as has been represented diagrammatically in FIG. 8. In fact, in this figure showing a position adopted when landing, for example, the tip 4b is not only raised about the axis 17 to conserve a sufficient footprint but also has a negative attack about the axis 15 so as to create an air brake.

Referring now to FIGS. 9a to 9e, there is represented one embodiment of the junction device 12 enabling the two degrees of freedom described above, associated with the first and second rotation axes 15, 17, to be obtained.

The junction device 12 includes a first actuator 30 for controlling rotation about the axis 15. This actuator 30 is positioned perpendicularly to the chord of the wing, being located at approximately 40% of the total length of that chord as seen from about as in FIG. 9a, starting from the leading edge. As indicated above, this control actuator 30 makes it possible to control the rotation of the wing tip 4b relative to the main part 4a, a junction plane 32 orthogonal to the direction Y being defined between these two elements. In this regard, it is noted that different attacks of the wing tip 4b have been represented in FIGS. 9b to 9d.

The junction device 12 also includes a second actuator 40 for controlling rotation about the axis 17. This second actuator 40 is placed in the vicinity of the first actuator 30 and oriented substantially parallel to the direction 14 of flow of the airflow over the wing, namely parallel to the direction X. As shown in the shaded portion of FIG. 9e, the second actuator 40 is closer to the fuselage than the first actuator 30 so that the latter is also caused to rotate with the wing tip 4b about the axis 17 by the second actuator 40.

Of course, various modifications may be made by the person skilled in the art to the invention that has just been described by way of nonlimiting example only.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft wing comprising:
a main part,
a wing tip mounted mobile in attack relative to the main part, and
a junction device between the wing tip and the main part of the wing, the junction device being configured to allow rotation of the wing tip relative to the main part about a first rotation axis enabling control in attack of the wing tip, and to allow rotation of the wing tip relative to the main part about a second rotation axis enabling the wing tip to be folded to raise the wing tip,
wherein the wing tip is mounted mobile in attack relative to the main part in accordance with a limited pivot amplitude about the first axis of rotation, wherein said limited pivot amplitude is capable of pivoting in a range of angles between 15° and −90°.

2. The aircraft wing as claimed in claim 1, wherein the first rotation axis is substantially parallel to a spanwise direction of the wing or is oriented substantially along a transverse direction of the aircraft, and wherein the second rotation axis is substantially parallel to a direction of flow of the airflow over the wing.

3. The aircraft wing as claimed in claim 1, wherein said limited pivot amplitude is capable of pivoting in a range of angles between 15 and −15°.

4. The aircraft wing as claimed in claim 1, wherein the junction device includes a first actuator and a second actuator respectively enabling control in attack and control in folding.

5. The aircraft wing of claim 1, the junction device is configured to allow rotation of the wing tip relative to the main part about a first rotation axis enabling control in attack of the wing tip via a first actuator, and to allow rotation of the wing tip relative to the main part about a second rotation axis enabling the wing tip to be folded to raise the wing tip via a second actuator, wherein the second actuator is located between the first actuator and the main part.

6. The aircraft of claim 5, wherein the first actuator is positioned perpendicularly to a chord of the wing, at approximately 40% of a total length of the chord.

7. The aircraft of claim 5, wherein the second actuator is oriented substantially parallel to a direction of flow of airflow over the wing.

8. The aircraft of claim 7, wherein the first actuator is oriented substantially perpendicularly to the first second actuator.

9. An aircraft comprising at least one wing, the aircraft wing comprising:
a main part,
a wing tip mounted mobile in attack relative to the main part, and
a junction device between the wing tip and the main part of the wing, the junction device being configured to allow rotation of the wing tip relative to the main part about a first rotation axis enabling control in attack of the wing tip via a first actuator in the wing tip, and to allow rotation of the wing tip relative to the main part about a second rotation axis enabling the wing tip to be folded to raise the wing tip via a second actuator,
wherein the second actuator is located between the first actuator and the main part.

10. The aircraft of claim 9, wherein the first actuator is positioned perpendicularly to a chord of the wing, at approximately 40% of a total length of the chord.

11. The aircraft of claim 9, wherein the second actuator is oriented substantially parallel to a direction of flow of airflow over the wing.

12. The aircraft of claim 11, wherein the first actuator is oriented substantially perpendicularly to the first second actuator.

13. A method of controlling an aircraft wing, the wing comprising:
a main part,
a wing tip mounted mobile in attack relative to the main part, and
a junction device between the wing tip and the main part of the wing, the junction device being configured to allow rotation of the wing tip relative to the main part about a first rotation axis enabling control in attack of the wing tip via a first actuator, and to allow rotation of the wing tip relative to the main part about a second rotation axis enabling the wing tip to be folded to raise the wing tip via a second actuator, wherein the second actuator is located between the first actuator and the main part, and,
the method comprising the step of controlling the wing tip in attack relative to the main part of the wing as a function of at least one flight parameter.

14. The method according to claim 13, wherein said at least one flight parameter comprises an altitude of the aircraft.

15. The method according to claim 13, wherein said at least one flight parameter comprises a mass of the aircraft.

* * * * *